UNITED STATES PATENT OFFICE.

ROBERT C. SCHÜPPHAUS, OF BROOKLYN, ASSIGNOR TO THE ARLINGTON MANUFACTURING COMPANY, OF NEW YORK, N. Y.

PYROXYLIN COMPOUND AND PROCESS OF MAKING SAME.

SPECIFICATION forming part of Letters Patent No. 528,812, dated November 6, 1894.

Application filed July 28, 1894. Serial No. 518,869. (No specimens.)

*To all whom it may concern:*

Be it known that I, ROBERT C. SCHÜPPHAUS, a citizen of the United States, residing at Brooklyn, in the county of Kings and State of New York, have invented new and useful Improvements in Pyroxylin Compounds and Processes of Manufacturing the Same, of which the following is a specification.

My invention relates to pyroxylin compounds, and processes of manufacturing the same. Its object is to replace the pyroxylin camphor compositions, both solid and liquid, which, serviceable and useful as they are, yet possess well known disadvantages.

It has been asserted that melted camphor is a solvent of the variety of pyroxylin employed in certain branches of manufacture, and processes founded on this supposed property have heretofore been described in the specifications of Letters-Patent and in various scientific papers.

It is well known that the melting point of camphor is higher than the temperature at which pyroxylin is decomposed, and my own extended investigations in this direction have convinced me that such processes are not, as yet, perfectly understood. When finely comminuted camphor and pyroxylin are heated together under great pressure, a material of horny appearance results; but, though it is unnecessary to raise the temperature to the melting point of camphor, there are always signs of decomposition of the pyroxylin. That the use of camphor as a solvent of pyroxylin is not practical, would seem evident from the fact that all manufacturers have had recourse to the employment of more or less expensive solvents, such, for example, as wood and grain alcohol, fusel oil and its various distillates, acetone and the like, in conjunction with camphor. The explanation of this matter appears to be that from the action of the camphor on the pyroxylin there results a new substance, or compound, which, although some of the camphor may be in an unstable combination, is endowed with new properties, its most important characteristic being that it is plastic at a temperature of about 75° centigrade.

I have found that there exists a whole class of well defined substances which may replace camphor in this process, and those of sufficiently low melting point are solvents of pyroxylin, *per se*, in the molten state. This class is formed by the acid, or alkoyl derivatives of the aromatic amins and their products of substitution, one atom of hydrogen in the amido-group of such amins being replaced by an acid radicle, or alkoyl. As is well known, an aromatic amin, the simplest type of which is anilin, $C_6.H_5.N.H_2$., reacts with an organic acid in the following manner:

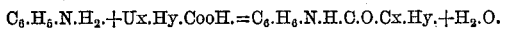

$$C_6.H_5.N.H_2.+Ux.Hy.CooH.=C_6.H_6.N.H.C.O.Cx.Hy.+H_2.O.$$

While in some cases simple boiling of the constituents is sufficient to produce these substances, it requires in others the employment of the acid anhydrid, or even its chlorid. However formed, it is this class which I wish to designate as comprising alkoyl derivatives of aromatic amins. I have employed the following representatives of this class: formanilid, melting point, 46° centigrade; ortho-acetoluid, melting point, 107° centigrade; para-acetoluid, melting point, 147° centigrade; benzanilid, melting point, 161° centigrade; para-cetphenitidin, melting point, 133° centigrade, and likewise the bromo and the nitroderivatives of such compounds. All these substances are solvents of pyroxylin in the melted state, or in suitable solution, as alcoholic for instance. It is easily perceived that this class offers a wide range, both as regards point of fusion and ready solubility in other solvents, should their employment appear desirable.

In practice I prefer to use the acetoluids. When toluene now cheaper than benzene, is nitrated, a mixture of chiefly ortho and para-nitrotoluene, with only very little of the meta-derivative, is formed. The operator has it in his power to make either the ortho, or the para-compound, preponderate. This crude nitrotoluene furnishes, on reduction, a mixture of the corresponding toluidines, from which, by proper methods, the acetotoluids are obtained. These are specially adapted to my process. The ortho-compound melts at 107° centigrade, the para, in the pure state, at 147° centigrade; yet a mixture of equal weights of ortho and para is practically liquid at the heat of the water-bath.

The mode of procedure employed in making my new compounds is similar to that usually employed in the manufacture of pyroxylin compounds, such as pyralin, celluloid and the like, the manipulation of which is so thoroughly understood by those skilled in this art that it is unnecessary here to further describe it.

Both the acetotoluids are easily prepared by boiling the respective toluidins with acetic acid for about one day. A reflux condenser, or similar contrivance, should be attached to the vessel. The product is freed from excess of acid by distillation, poured into water while fluid, and purified by recrystallization. Acetyl chlorid, or acetic anhydrid may be used instead of acetic acid, when the re-action takes place in much less time.

The re-actions are:

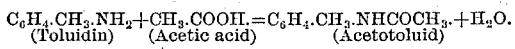
(Toluidin)   (Acetic acid)   (Acetotoluid)

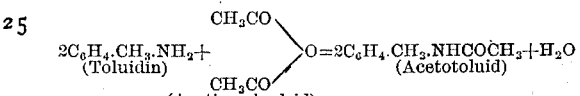
(Toluidin)   (Acetic anhydrid)   (Acetotoluid)

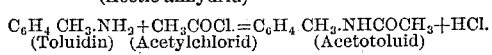
(Toluidin)  (Acetylchlorid)   (Acetotoluid)

The formulæ of the compounds specifically mentioned are: formanilid, $C_6H_5.NHCOH$; ortho-acetotoluid, $C_6H_4.\overset{1}{C}H_3.NH\overset{2}{C}OCH_3$; para-acetotoluid, $C_6H_4.\overset{1}{C}H_3.N\overset{4}{H}COCH_3$; benzanilid, $C_6H_5.NHCOC_6H_5$; paracetphinitidin, $C_6H_4.O\overset{1}{C}_2H_5.N\overset{4}{H}COCH_3$.

What I claim is—

1. The process herein described which consists in mingling pyroxylin with one or more alkoyl derivatives of aromatic amins or their products of substitution in a state of fusion, or of solution, substantially as described.

2. The process described, which consists in treating pyroxylin with one or more alkoyl derivatives of aromatic amins or their products of substitution under heat and pressure, substantially as described.

3. As a new article of manufacture, the product described, the same consisting of a compound of pyroxylin with one or more alkoyl derivatives of aromatic amins or their products of substitution, substantially as described.

In testimony whereof I have hereunto set my hand and affixed my seal in presence of two subscribing witnesses.

ROBERT C. SCHÜPPHAUS. [L. S.]

Witnesses:
 CARL STEINKE,
 CHRISTIAN R. AHRENS.

Correction in Letters Patent No. 528,812.

It is hereby certified that the assignee, "The Arlington Manufacturing Company," in Letters Patent No. 528,812, granted November 6, 1894, upon the application of Robert C. Schüpphaus, of Brooklyn, New York, for an improvement in "Pyroxylin Compounds and Process of Making the Same," should have been described and specified as *The Arlington Manufacturing Company, a corporation organized under the laws of the State of New Jersey, and doing business at New York, N. Y.;* and that the said Letters Patent should be read with this correction therein that the same may conform to the record of the case in the Patent Office.

Signed, countersigned, and sealed this 13th day of November, A. D. 1894.

[SEAL.]
                                          JNO. M. REYNOLDS,
                                             *Assistant Secretary of the Interior.*

Countersigned:
    JOHN S. SEYMOUR,
        *Commissioner of Patents.*